No. 717,123. Patented Dec. 30, 1902.
P. ROUGET.
ELECTRICITY METER.
(Application filed Jan. 30, 1902.)

(No Model.) 2 Sheets—Sheet 1.

WITNESSES: INVENTOR:
Fred White Paul Rouget,
Domingo Alana By his Attorneys:

No. 717,123.

P. ROUGET.
ELECTRICITY METER.
(Application filed Jan. 30, 1902.)

Patented Dec. 30, 1902.

(No Model.)

2 Sheets—Sheet 2.

WITNESSES

INVENTOR:
Paul Rouget,
By his Attorneys

UNITED STATES PATENT OFFICE.

PAUL ROUGET, OF PARIS, FRANCE, ASSIGNOR TO COMPAGNIE ANONYME CONTINENTALE POUR LA FABRICATION DES COMPTEURS À GAZ ET AUTRES APPAREILS, OF PARIS, FRANCE.

ELECTRICITY-METER.

SPECIFICATION forming part of Letters Patent No. 717,123, dated December 30, 1902.

Application filed January 30, 1902. Serial No. 91,832. (No model.)

*To all whom it may concern:*

Be it known that I, PAUL ROUGET, a citizen of the Republic of France, residing in Paris, France, have invented certain new and useful Improvements in Electricity-Meters, of which the following is a specification.

The accompanying drawings show these improvements applied to my Vulcain meter.

Figure 1:
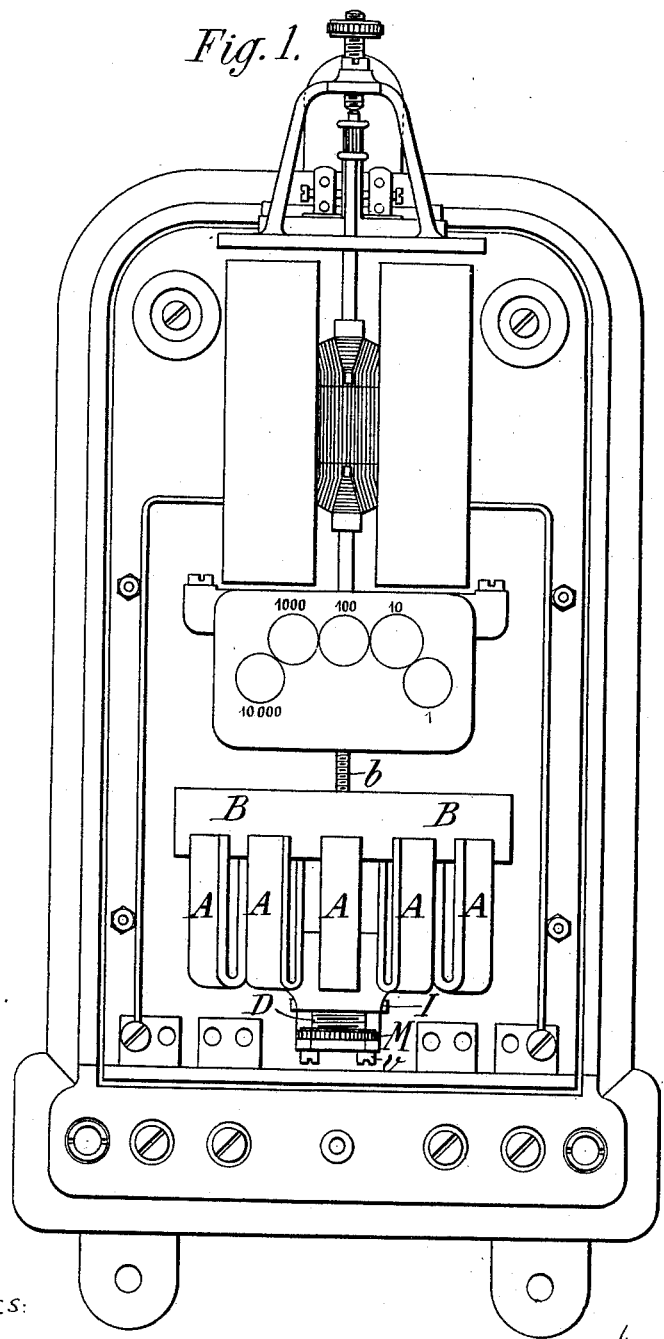
Figure 2:
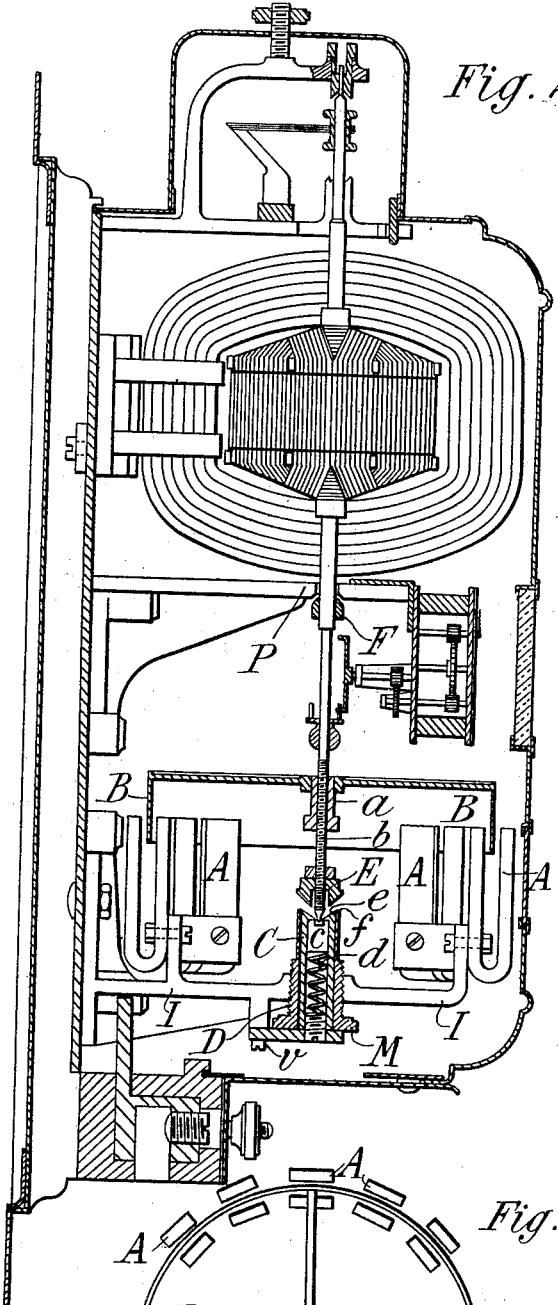
Figure 3:
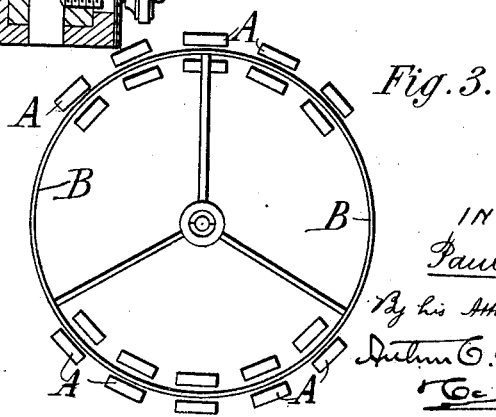

Figure 1 is a front elevation. Fig. 2 is a transverse section. Fig. 3 is a plan of the ring of magnets.

In the meters of electrical energy which have a Foucault brake it happens that the magnets, owing to a short circuit in the connections, may be subjected to the action of an intense field and lose the greater part of their force. Under these conditions the meter is deranged and its indications are wrong. In order to avoid this damage, I have arranged the magnets A in groups parallel to the flux—that is to say, perpendicular to the direction of the current in the inductors. This arrangement also allows a lessening of the distance between the magnets and the inductors, which when they are traversed by a current create a field very weak indeed, but permanent, and in time effective in influencing the magnets.

The new arrangements which I give to the magnets in my Vulcain meter no longer allowing me to regulate the depth to which the copper drum or cylinder B can pass down between the magnets A by varying the position of the latter, these being mounted on a sleeve that can be moved up or down a screw-threaded spindle, I have, in order to make use of screw regulation, made the magnets A stationary and have mounted the copper drum or cylinder on a sleeve $a$, screwed upon a threaded part $b$ of the armature-spindle, thus maintaining the advantage of an easy and certain regulation of the brake. Once the position of the drum relatively to the magnets is well determined the drum is fixed on the armature-spindle by a setting-screw. The same arrangement is applicable when a disk is employed instead of a drum.

When meters are moved from place to place, the wise precaution is taken to fix the movable parts so as not to damage their pivots or bearings, and for this purpose the pivot can be slightly raised, so as to be kept away from its bearing. If, as in the case of the Vulcain meter, the magnets are stationary, and if the disk forms part of the movable portion, it is necessary that when the meter is put in place in releasing the movable part it should resume the exact position which it occupied after the calibration of the meter. The arrangement which I have devised meets this requirement, for the bearing $c$ is supported by a spring $d$ in a socket C, fixed securely to the framing I of the apparatus. Concentric with the socket C there is screwed in a swelled part of the bridge I a sleeve D, having a milled head M and its top reaching to the edge of the conical hollow $e$ of the socket C. When the sleeve D is turned by its milled head M, its upper end $f$ meets a piece E and raises the movable part until the cone F on the upper part of the shaft wedges itself in the bridge P. The armature is thus fixed without any movement of the bearing of its pivot.

In releasing the meter in order that the armature may be free the pivot must rest on the bearing—that is to say, the copper cylinder B has resumed the position between the magnets determined by the calibration. This arrangement for fixing the armature independently of the pivot-bearing allows the socket C to be dismounted from the bridge I by removing screws $v$. When this socket C is removed, free access is given to the steel pivot of the armature-spindle, which is let in, and which can be readily changed if the point is accidentally damaged. This operation is rendered easy by the steadiness of the fixed part of the apparatus.

Having thus described the nature of this invention and the best means I know of carrying the same into practical effect, I claim—

1. In an electricity-meter, a series of magnets arranged in separated groups parallel to the flux, whereby none of them can be influenced by the field created by an intense current, even in short circuit.

2. In an electricity-meter, the combination of a series of magnets in separated groups fixed in position parallel to the flux, an armature therefor, and means for adjusting the position of the armature relatively to the magnets.

In witness whereof I have hereunto signed my name in the presence of two subscribing witnesses.

PAUL ROUGET.

Witnesses:
JULES ARMENGAUD, Jeune,
MARCEL ARMENGAUD, Jeune.